United States Patent [19]
Ganard et al.

[11] Patent Number: 5,996,573
[45] Date of Patent: Dec. 7, 1999

[54] INSERT FOR TOP CASTING OF BARBECUE GRILL

[75] Inventors: John Ganard, New Braunfels, Tex.; Mark Windham, Cataula, Ga.

[73] Assignee: W. C. Bradley Company, Columbus, Ga.

[21] Appl. No.: 08/908,282

[22] Filed: Aug. 7, 1997

Related U.S. Application Data

[60] Provisional application No. 60/023,568, Aug. 7, 1996.

[51] Int. Cl.[6] ....................................................... A47J 37/00

[52] U.S. Cl. ..................... 126/41 R; 126/25 R; 126/200; 126/211; 220/254

[58] Field of Search ................................ 126/25 R, 41 R, 126/200, 211; 248/231.81; 220/254; 99/341

[56] References Cited

U.S. PATENT DOCUMENTS

| 3,667,648 | 6/1972 | Koziol | 126/200 X |
| 4,729,364 | 3/1988 | Dailey | 126/41 R |
| 5,088,470 | 2/1992 | James, Jr. et al. | 126/41 R |
| 5,441,226 | 8/1995 | Craven, Jr. et al. | 126/200 |

Primary Examiner—Larry Jones
Attorney, Agent, or Firm—Thomas, Kayden, Horstemeyer & Risley, LLP

[57] ABSTRACT

The invention is directed to a top cover for a barbecue grill which includes a casting with an aperture formed in the surface. A flexible insert is designed to close the aperture. The casting includes a support on at least one side of the aperture and at least one fastener to hold the insert in place in the casting. The support and fastener also seal the aperture by pressing the insert against the casting.

14 Claims, 2 Drawing Sheets

INSERT FOR TOP CASTING OF BARBECUE GRILL

This application claims priority to U.S. Provisional Patent Application Serial No. 60/023,568, filed Aug. 7, 1996.

INSERT FOR TOP CASTING OF BARBECUE GRILL

Most gas barbecue grills are generally rectangular in shape and are formed from cast aluminum or other metal. Many of the grills manufactured by the Assignee of the present invention have a distinctive generally triangular profile for the top casting. It is common to provide the top casting of the grill with either a solid wall design or a windowed design in which an aperture is formed in the casting. A window pane or panel is then mounted over this aperture to allow the cook to view the food being cooked on the barbecue grill. Heretofore, these have been the only options available to manufacturers and thus the ability to customize the appearance of the barbecue grill has been somewhat limited. Thus, a need exists in the art for a top casting for a barbecue grill which can be customized to fit a particular decor which provides certain cooking advantages depending on its construction and which avoids any of the disadvantages of the prior art.

SUMMARY OF THE INVENTION

It is therefore one of the principal objects of the present invention to provide a top casting for barbecue grill which has an aperture formed therein to receive an insert, which insert is easily secured by the customer.

Another object of the present invention is to also provide for ease of removal of the insert should the customer wish to change the appearance or function of the grill and which is durable to provide a long service life.

These and other objects are attained by the present invention which relates to a barbecue grill top casting having an aperture formed therein. Receiving means are provided in the casting for receiving an edge of the insert and securing means are used typically opposite of the receiving means to secure the insert in place. The insert itself is over-formed to provide a closely tolerant fit for aesthetic reasons as well as to enhance the performance of the barbecue grill.

Various additional objects and advantages of the present invention will become apparent from the following detailed description with reference to the accompanying drawings.

DETAILED DESCRIPTION OF THE PREFERRED EMBODIMENT

Figure 1:
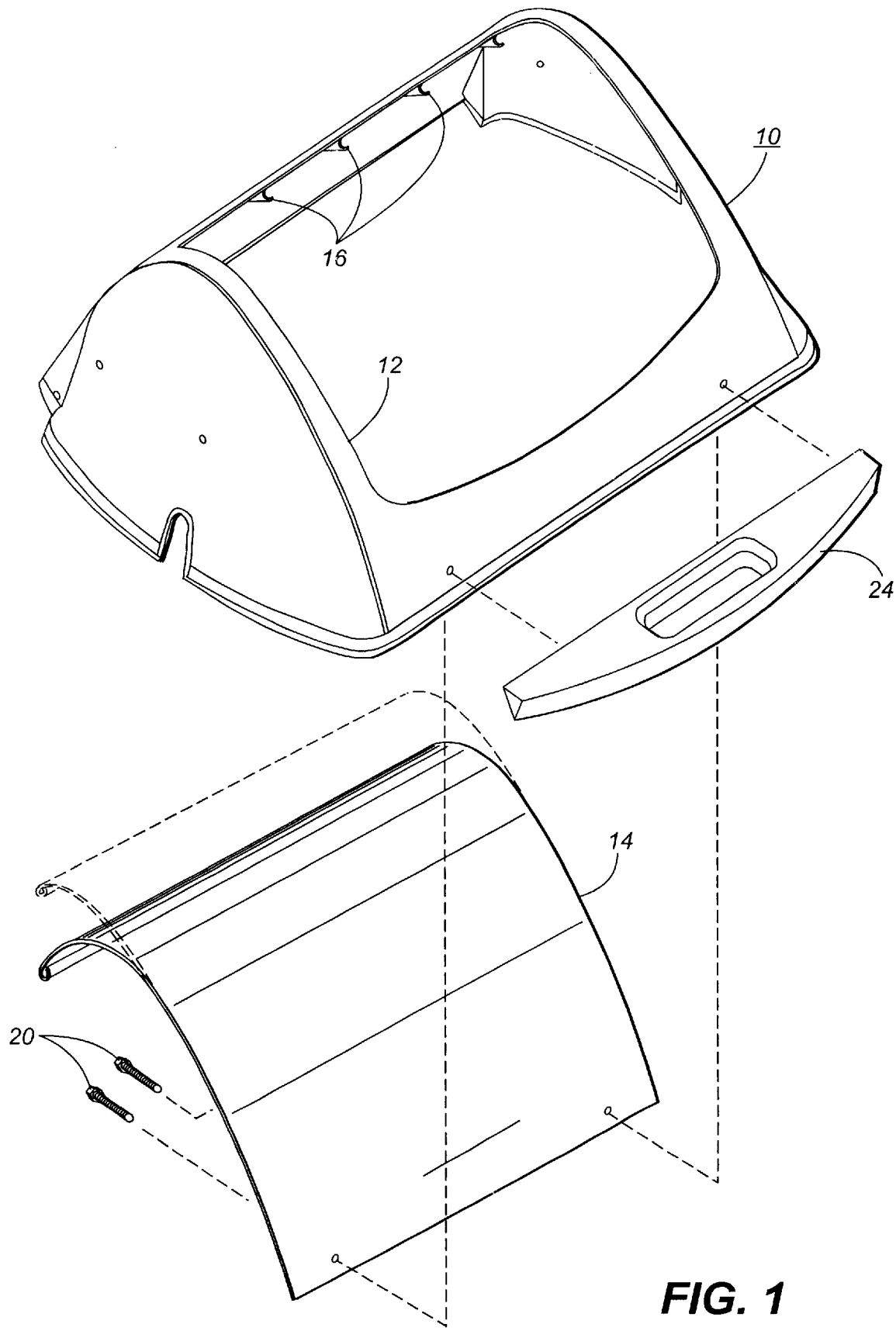
FIG. 1 is an exploded perspective view showing the top casting of the barbecue grill, the insert member and the handle.
Figure 2:
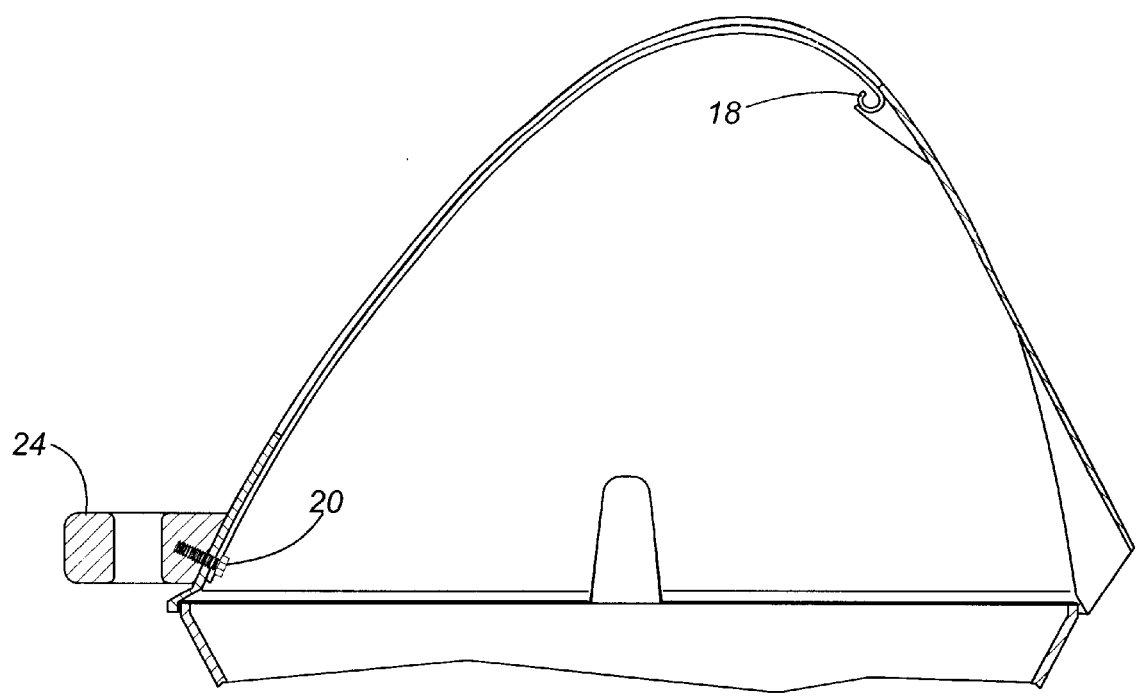
FIG. 2 is a partial side elevational view showing partially in cross section illustrating the insert in place in the top casting of the barbecue grill.
Figure 3:
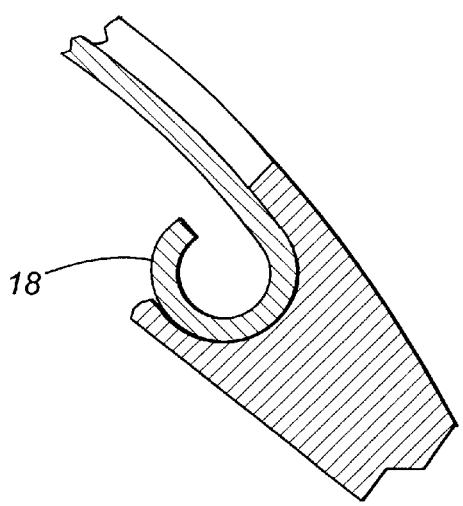
FIG. 3 is a partial enlarged view of the insert panel mounted in the receiving means in the top casting.

Referring now more specifically to the drawings and to FIG. 1 in particular, numeral 10 designates generally the top casting for a barbecue grill. As can be seen, the casting is provided with an opening 12 which encompasses some of the top portion and most of the front portion of the casting 10. The opening is provided or formed during the casting process. This opening is designed to receive a decorative metal insert 14, which may be stainless steel, or which may have a porcelainized coating. Support or receiving means 16 are provided at the top of the opening 12 either during the casting process or after the top casting has been produced. These supports have a generally semi-circular profile and receive, as shown in FIGS. 2 and 3, the rounded or rolled edge 18 of insert 14. The installation is completed by inserting a screw or screws 20 through the lower end of the insert, through the barbecue grill casting and in the application shown, through the handle of the barbecue grill. The fastening method is designed to facilitate assembly by the consumer and also to facilitate changing the insert to, for example, a different insert, as desired by the consumer. The opening may also be used to receive a suitable window or other insert material that is heat resistant, and either decorative and/or functional.

The present invention provides several advantages and improvements over previous conventional designs. The complete assembly is more rigid than known conventional designs in which the insert is attached to and held between end caps, which can result in a loose fit of the insert. The present invention, on the other hand, provides a rigid mounting of the insert which eliminates cyclic stressing and subsequent coating fracture. The cradle support means speeds and simplifies installation by the consumer.

The radius of the casting is greater than the radius of the insert 14. Thus, when the rolled edge 18 of the insert is placed into the holders 16, the bottom portion of the insert is flexed toward the casting in order to attach the insert to the casting and to the handle 24 using screws 20. The over-formed insert is preloaded and rolls up when fastening to the die cast top to provide a gapless mating with the die casting. Proper fit can be maintained even with modest profile changes in either part due to process variations.

The insert may be composed of various materials. For example, it can be formed from brushed stainless steel, which provides both a decorative function and a heat reflective function when the grill is in operation. Similarly, the insert could be aluminum or a similar metal, coated with porcelain. This provides the same heat reflective function, but increases the decorative possibilities, as the porcelain coating can be virtually any color. As an insert having a porcelainized coating cannot be bent significantly, the preloading of the insert is relatively slight, which provides the desired substantially flush fit while preventing deformation of the insert which could result from a loose fitting installation. As mentioned, the preloading also allows for tolerance variations which are taken up as the insert is made tight to the opening in the top casting. If desired, the interior side of the insert may be covered with an insulative material to prevent the possible discoloration of the insert and to increase its heat reflective properties.

Figure 4:
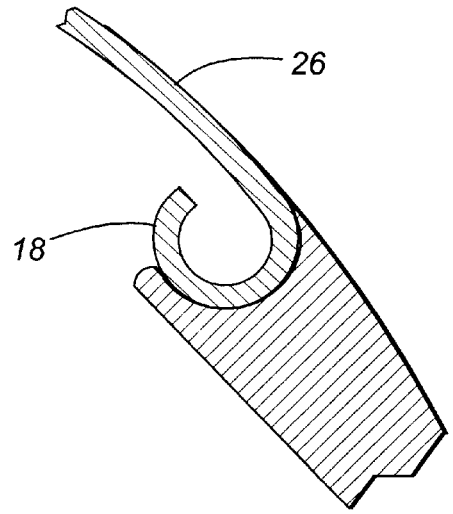
FIG. 4 is a partial enlarged view similar to FIG. 3 illustrating a top casting having a tapered edge where the casting and insert meet.

FIG. 4 illustrates a variation of the present invention where the edge 26 of the insert-receiving aperture is tapered or feathered to create a more flush fit of the insert at the top edge of the aperture.

Thus, while an embodiment and variations thereof of an insert attachment for the top casting of a barbecue grill has been shown and described in detail herein. Various additional modifications may be made without departing from the scope of the present invention.

We claim:

1. A top cover for a barbecue grill comprising a casting with an aperture formed therein, a flexible insert designed to substantially close said aperture, said casting including a support on at least one side of said aperture, and at least one fastener to hold said insert in place in said casting and seal said aperture by pressing said insert against said casting.

2. A top cover as defined in claim 1 in which said casting has a curved profile.

3. A top cover as defined in claim 2 in which said insert has a curved profile.

4. A top cover as defined in claim 2 in which said insert has a curved profile with a curvature more pronounced that the curvature of said casting.

5. A top cover as defined in claim 1 in which said insert includes an insulated liner.

6. A top cover as defined in claim 1 in which said insert includes tapered edges so as to fit substantially flush against said casting.

7. A cover for a barbecue grill or the like comprising a casting member with an aperture formed therein, and a flexible insert for closing said aperture, said insert having a curved profile and being flexed against said casting member for sealing said aperture.

8. The cover as defined in claim 7, wherein said cover includes a support on at least a portion of said aperture for retaining a corresponding portion of said insert.

9. A cover for a barbecue grill or the like comprising a casting member with an aperture formed therein, a flexible insert for closing said aperture, and fastening means for securing said insert to said casting, said fastening means including a support on at least one side of said aperture for retaining a corresponding portion of said insert and screws disposed generally opposite said support.

10. A cover for a barbecue grill or the like comprising a casting member with an aperture formed therein, a flexible insert for closing said aperture, and fastening means for securing said insert to said casting, wherein said insert has a curved profile and is flexed against said casting member for sealing said aperture.

11. A cover for a barbecue grill or the like comprising a casting member with an aperture formed therein, a flexible insert for closing said aperture, and fastening means for securing said insert to said casting wherein said insert includes an insulated liner.

12. A hood assembly for a barbecue grill comprising a casting having an aperture formed therein, a curved, flexible insert designed to cover said aperture, said casting including at least one support formed adjacent said aperture for supporting said insert in a position to cover said apertures and at least one fastener to fix said insert in place such that said insert is forced into a sealing relationship with said casting.

13. A hood assembly for a barbecue grill comprising a casting having an aperture formed therein, a curved, flexible insert designed to cover said aperture, said casting including means for supporting said insert in a position to cover said aperture and at least one fastener to fix said insert in place, wherein said casting has a curved profile and said insert has a more pronounced curvature relative to said casting such that said insert is forced into a sealing relationship with said casting by said fastener.

14. A hood assembly for a barbecue grill comprising a casting having an aperture formed therein, a curved, flexible insert designed to cover said aperture, said casting including means for supporting said insert in a position to cover said aperture and at least one fastener to fix said insert in place, wherein said insert has an insulated liner.

* * * * *